(12) United States Patent
Sugama et al.

(10) Patent No.: US 10,268,175 B2
(45) Date of Patent: Apr. 23, 2019

(54) INFORMATION PRESENTATION METHOD AND INFORMATION PRESENTATION APPARATUS

(71) Applicants: FUJITSU LIMITED, Kawasaki-shi, Kanagawa (JP); FUJITSU FACILITIES LIMITED, Kawasaki-shi, Kanagawa (JP)

(72) Inventors: Yasushi Sugama, Yokohama (JP); Yasushi Tateno, Moka (JP); Masatoshi Kimura, Kawasaki (JP); Kazunori Maruyama, Zama (JP); Tetsuo Yamamoto, Kobe (JP); Kota Ichinose, Kawasaki (JP)

(73) Assignees: FUJITSU LIMITED, Kawasaki (JP); FUJTISU FACILITIES LIMITED, Kawasaki (JP)

( * ) Notice: Subject to any disclaimer, the term of this patent is extended or adjusted under 35 U.S.C. 154(b) by 0 days.

(21) Appl. No.: 15/218,691

(22) Filed: Jul. 25, 2016

(65) Prior Publication Data

US 2017/0031341 A1 Feb. 2, 2017

(30) Foreign Application Priority Data

Jul. 31, 2015 (JP) ................. 2015/152315

(51) Int. Cl.
*G05B 19/12* (2006.01)
*H04L 29/08* (2006.01)
(Continued)

(52) U.S. Cl.
CPC ......... *G05B 19/128* (2013.01); *G05B 19/042* (2013.01); *G06K 7/10712* (2013.01);
(Continued)

(58) Field of Classification Search
CPC .......... G05B 19/128; G05B 2219/2614; G06K 7/10712; G06K 7/1443
(Continued)

(56) References Cited

U.S. PATENT DOCUMENTS 4,964,066 A * 10/1990 Yamane .................. G06T 17/00
235/454
6,262,662 B1 * 7/2001 Back ..................... G06K 7/0008
340/4.1
(Continued)

FOREIGN PATENT DOCUMENTS

JP 2003-330615 A 11/2003
JP 2004-318400 A 11/2004
(Continued)

OTHER PUBLICATIONS

Office Action dated Dec. 25, 2018, issued in counterpart Japanese Application No. 2015-152315, with English machine translation. (6 pages).

*Primary Examiner* — Paultep Savusdiphol
(74) *Attorney, Agent, or Firm* — Westerman, Hattori, Daniels & Adrian, LLP

(57) ABSTRACT

A computer-implemented method includes obtaining one of image information of a recording medium placed in a sensing area and tag information attached to the recording medium; obtaining environmental control information corresponding to the obtained one of image information and tag information from a storage; and based on the obtained environmental control information, controlling one or more of a light-emitting device, a display device, an audio device, a temperature control device, an air-flow control device, a vibration device, and an aroma emitting device that are disposed around the sensing area.

13 Claims, 21 Drawing Sheets

(51) Int. Cl.
  *G06K 7/10* (2006.01)
  *G06K 7/14* (2006.01)
  *G05B 19/042* (2006.01)
  *H04L 29/06* (2006.01)

(52) U.S. Cl.
  CPC .......... *G06K 7/1443* (2013.01); *H04L 67/125* (2013.01); *H04L 67/38* (2013.01); *G05B 2219/2614* (2013.01)

(58) Field of Classification Search
  USPC ................ 235/375, 454, 462.13, 462.15
  See application file for complete search history.

(56) References Cited

U.S. PATENT DOCUMENTS

| | | | |
|---|---|---|---|
| 6,655,586 B1 * | 12/2003 | Back | G06K 7/0008 235/375 |
| 6,774,900 B1 | 8/2004 | Kubota et al. | |
| 9,310,882 B2 * | 4/2016 | Kochi | G06F 3/011 |
| 2013/0126596 A1 * | 5/2013 | Fletcher | G06Q 10/04 235/375 |
| 2013/0171603 A1 * | 7/2013 | Self | G09B 5/065 434/317 |
| 2013/0201185 A1 * | 8/2013 | Kochi | G06F 3/011 345/419 |
| 2016/0224103 A1 * | 8/2016 | Kochi | G06F 3/011 |

FOREIGN PATENT DOCUMENTS

| | | |
|---|---|---|
| JP | 2005-236821 A | 9/2005 |
| JP | 2008-521070 A | 6/2008 |
| JP | 2014-119687 A | 6/2014 |
| JP | 2015-5967 A | 1/2015 |
| WO | 00/49579 A1 | 8/2000 |
| WO | 2006/030407 A1 | 3/2006 |

* cited by examiner

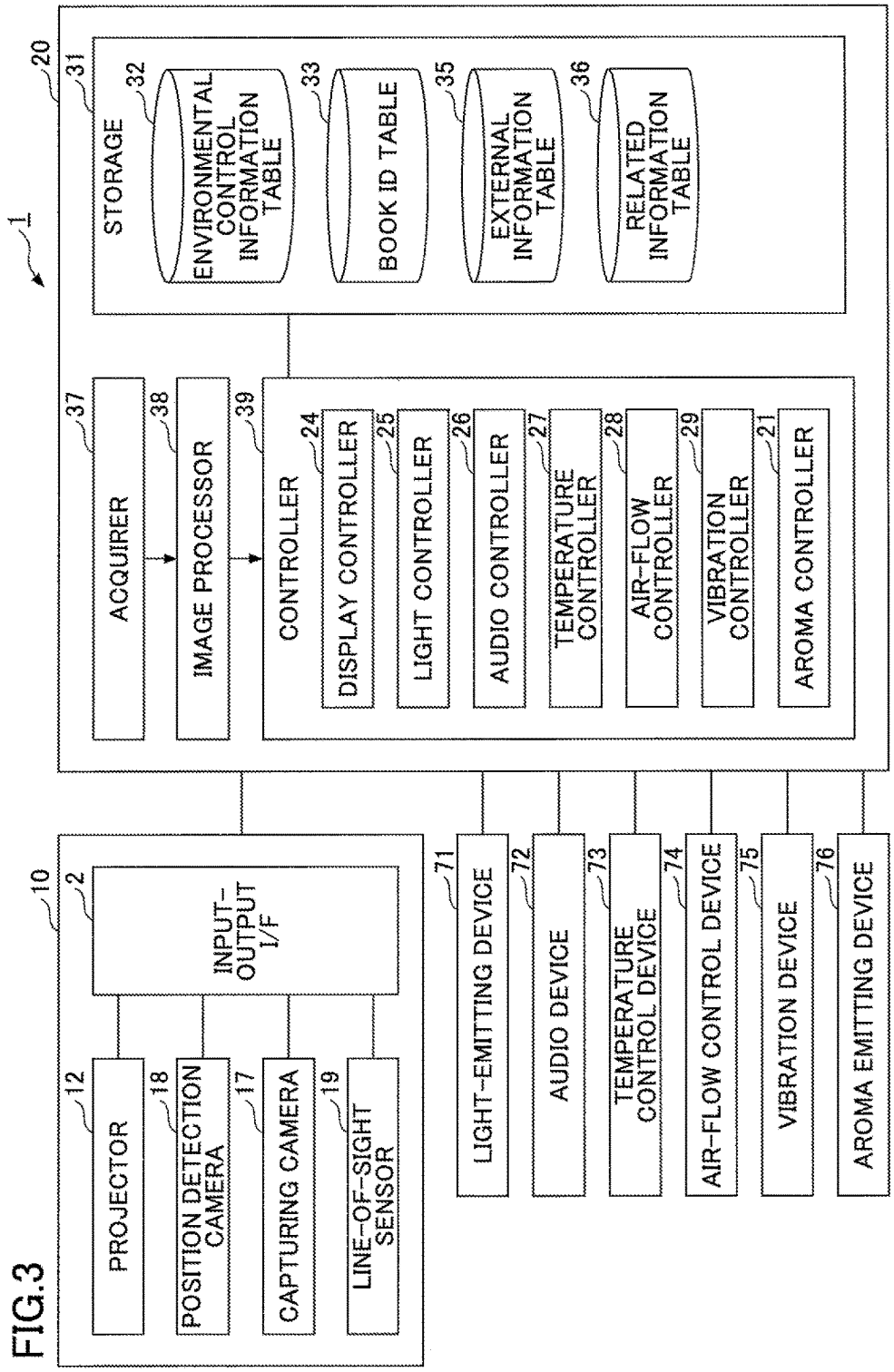

FIG.4

| BOOK IDENTIFICATION INFORMATION | IMAGE INFORMATION | CONTROL INFORMATION |
|---|---|---|
| | PAGE 1 IMAGE | PAGE 1 CONTROL INFORMATION |
| | PAGE 2 IMAGE | PAGE 2 CONTROL INFORMATION |
| | PAGE 3 IMAGE | PAGE 3 CONTROL INFORMATION |
| | ... | ... |
| | PAGE n (LAST PAGE) IMAGE | LAST PAGE CONTROL INFORMATION |

FIG.6

| BOOK IDENTIFICATION INFORMATION | TAG INFORMATION | CONTROL INFORMATION |
|---|---|---|
| | PAGE 1 TAG INFORMATION | PAGE 1 CONTROL INFORMATION |
| | PAGE 2 TAG INFORMATION | PAGE 2 CONTROL INFORMATION |
| | PAGE 3 TAG INFORMATION | PAGE 3 CONTROL INFORMATION |
| | ... | ... |
| | PAGE n (LAST PAGE) TAG INFORMATION | LAST PAGE CONTROL INFORMATION |

FIG.8

| TAG INFORMATION | BOOK IDENTIFICATION INFORMATION |
|---|---|
| AR MARKER 1 | BOOK ID1 |
| AR MARKER 2 | BOOK ID2 |
| ⋮ | ⋮ |

FIG.12

| IMAGE INFORMATION | ADDITIONAL INFORMATION | | | CONTROL INFORMATION |
|---|---|---|---|---|
| IMAGE 1 | USER OPERATION 1 | | | CONTROL INFORMATION 1 |
| | USER OPERATION 2 | ENVIRONMENTAL INFORMATION 1 | | CONTROL INFORMATION 2 |
| | | ENVIRONMENTAL INFORMATION 2 | | CONTROL INFORMATION 3 |
| | USER OPERATION 3 | | | CONTROL INFORMATION 4 |
| | ENVIRONMENTAL INFORMATION 1 | | | CONTROL INFORMATION 5 |
| IMAGE 2 | USER OPERATION 1 | ENVIRONMENTAL INFORMATION 1 | | CONTROL INFORMATION 6 |
| | | ENVIRONMENTAL INFORMATION 2 | | CONTROL INFORMATION 7 |
| | USER OPERATION 2 | | | CONTROL INFORMATION 8 |
| ... | ... | | | ... |

FIG.14

| IMAGE INFORMATION 331 | LINE-OF-SIGHT INFORMATION 333 | BOOK IDENTIFICATION INFORMATION 332 |
|---|---|---|
| IMAGE 1 | DIRECTION A | BOOK ID10 |
| IMAGE 1 | DIRECTION B | BOOK ID3 |
| IMAGE 1 | DIRECTION C | BOOK ID20 |
| IMAGE 1 | DIRECTION D | BOOK ID5 |
| ... | ... | ... |

FIG.15

| USER ID | | | |
|---|---|---|---|
| DATE INFORMATION | BORROWED-BOOK INFORMATION | CLASSIFICATION INFORMATION | |
| 2014.8.8 | BOOK ID10 | ILLUSTRATED ANIMAL ENCYCLOPEDIA | |
| 2014.9.10 | BOOK ID35 | HOW TO BREED RABBITS | |
| 2015.1.5 | BOOK ID3 | ANIMAL DISEASES | |
| 2015.3.3 | BOOK ID4 | RABBIT FOOD | |

FIG.16

| INTEREST INFORMATION | RELATED PAGES |
|---|---|
| ANIMAL | ALL PAGES |
| ANIMAL+RABBIT | PAGES 5-10 |
| ANIMAL+RABBIT+FOOD | PAGES 8-10 |
| ANIMAL+RABBIT+DISEASE | PAGES 7-8 |
| ANIMAL+RABBIT+DISEASE+FOOD | PAGE 8 |

INFORMATION PRESENTATION METHOD AND INFORMATION PRESENTATION APPARATUS

CROSS-REFERENCE TO RELATED APPLICATION

This application is based upon and claims the benefit of priority of Japanese Patent Application No. 2015-152315 filed on Jul. 31, 2015, the entire contents of which are incorporated herein by reference.

FIELD

An aspect of this disclosure relates to an information presentation method and an information presentation apparatus.

BACKGROUND

There are known technologies for displaying electronic data such as image data and text data on a display to present information to users. For example, Japanese Laid-Open Patent Publication No. 2015-005967, Japanese Laid-Open Patent Publication No. 2004-318400, and International Publication Pamphlet No. WO 2000/049579 disclose technologies for giving special effects to displayed data of, for example, a digital illustrated encyclopedia.

However, the technologies disclosed in Japanese Laid-Open Patent Publication No. 2015-005967, Japanese Laid-Open Patent Publication No. 2004-318400, and International Publication Pamphlet No. WO 2000/049579 are for giving special effects to electronic data displayed in a virtual space, and cannot give special effects to, for example, an object in a real space.

SUMMARY

According to an aspect of this disclosure, there is provided a computer-implemented method that includes obtaining one of image information of a recording medium placed in a sensing area and tag information attached to the recording medium; obtaining environmental control information corresponding to the obtained one of image information and tag information from a storage; and based on the obtained environmental control information, controlling one or more of a light-emitting device, a display device, an audio device, a temperature control device, an air-flow control device, a vibration device, and an aroma emitting device that are disposed around the sensing area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram illustrating an exemplary functional configuration of an information presentation apparatus according to an embodiment;

FIG. 4 is a drawing illustrating an exemplary environmental control information table;

FIG. 6 is a drawing illustrating another exemplary environmental control information table;

FIG. 8 is a drawing illustrating art exemplary book ID table;

FIG. 12 is a drawing illustrating another exemplary environmental control information table;

FIG. 14 is a drawing illustrating another exemplary book ID table;

FIG. 15 is a drawing illustrating an exemplary external information table;

FIG. 16 is a drawing illustrating an exemplary related information table;

DESCRIPTION OF EMBODIMENTS

Embodiments of the present invention are described below with reference to the accompanying drawings. In the specification and the drawings, the same reference number is assigned to components having substantially the same function, and repeated description, of those components is omitted.

<Configuration of Information Presentation Apparatus>

An exemplary configuration of an information presentation apparatus 1 according to an embodiment is described below with reference to FIG. 1. The information presentation apparatus 1 may include a projection device 10 and an information processing apparatus 20. The projection device 10 and the information processing apparatus 20 are connected to each other via a universal serial bus (USB).

The information presentation apparatus 1 is placed, for example, on a desk 50 provided in a space such as a reading booth of a bookstore. For example, the information presentation apparatus 1 is used when a user brings a book to a reading booth of a bookstore and reads the book placed on the desk 50 in the reading booth. However, the information presentation apparatus 1 can also be used in any other place such as a shop or an exhibition booth.

Figure 1:
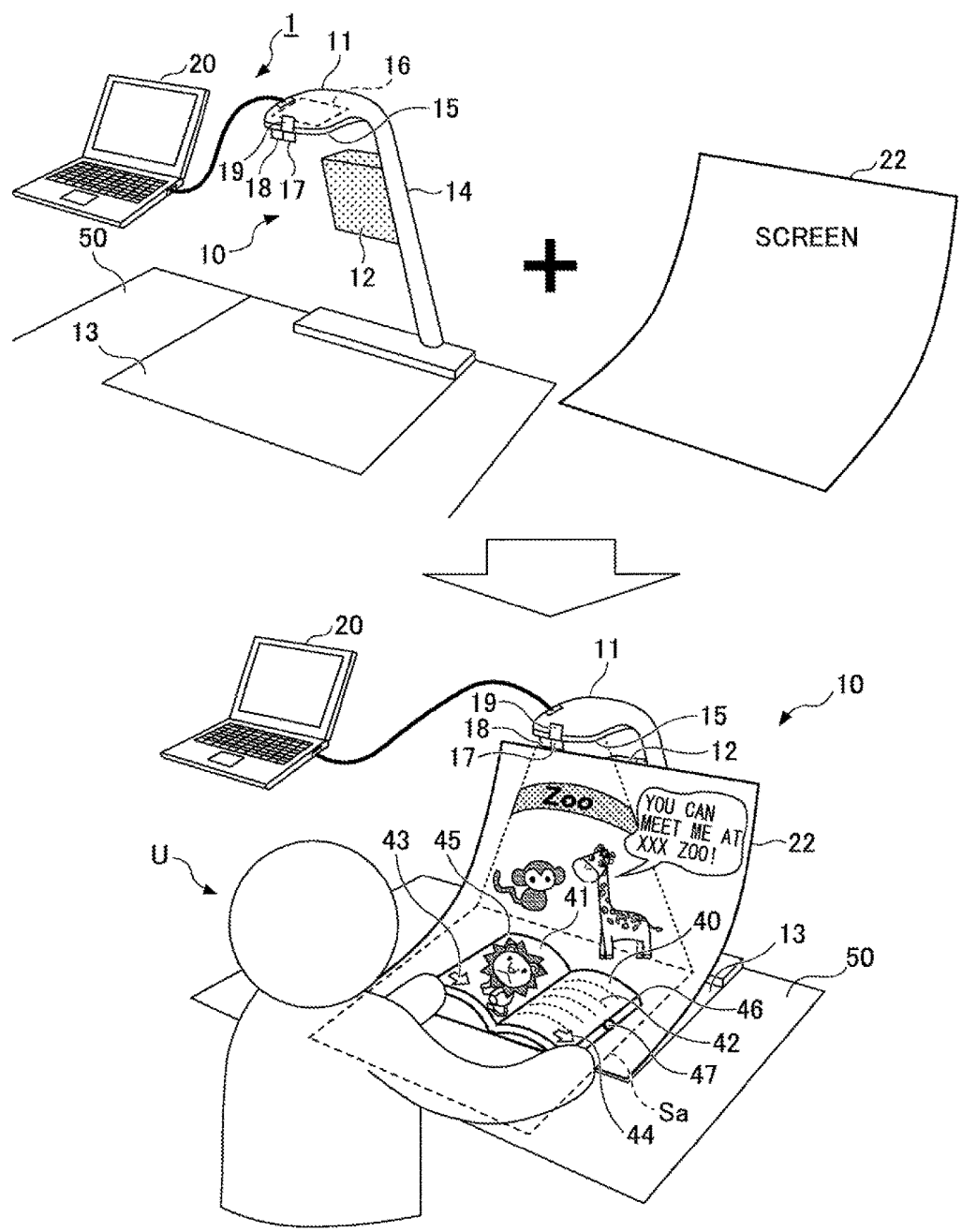
FIG. 1 is a drawing illustrating an exemplary configuration of an information presentation apparatus according to an embodiment.

In the example of FIG. 1, the projection device 10 is placed on the desk 50 in the reading booth. The projection device 10 may include a projecting part 11, a projector 12, a mount 13, and a support 14. The projecting part 11 is supported by the support 14 above the mount 13, and projects projection information toward the mount 13. The projector 12 is attached to the middle of the support 14.

A screen 22 is attached to the projection device 10. The screen 22 is leaned against the support 14 such that the screen 22 extends from the mount 13 to the support 14. Projection information (e.g., image or light) output from the projector 12 is reflected by a reflector plate 15 attached to a back side of the projecting part 11 and is thereby projected onto the screen 22. With this configuration, the projector 12 can project content information onto the screen 22.

Figure 2A:
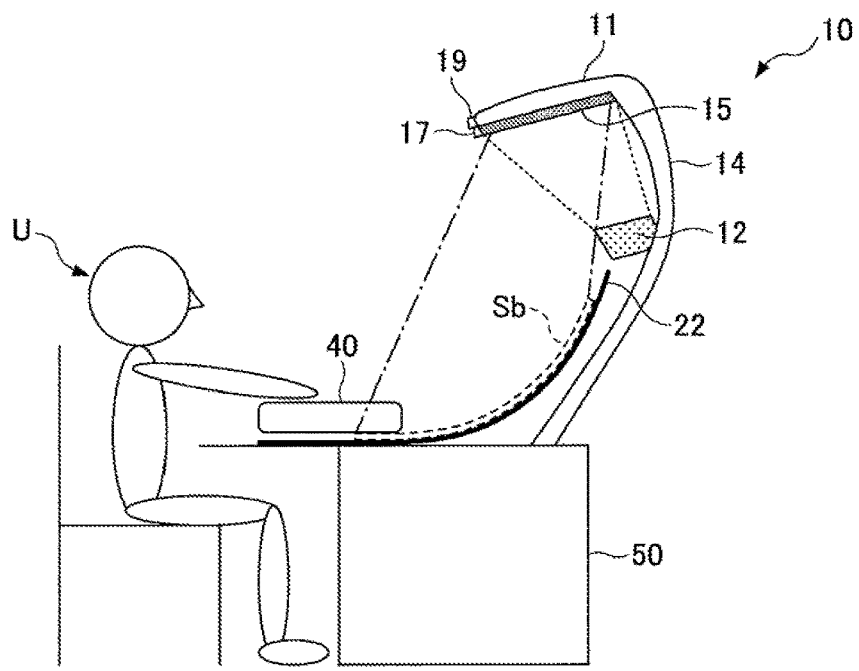
FIG. 2A is a side view and FIG. 2B is a plan view of an information presentation apparatus according to an embodiment.

FIG. 2A is a side view of the information presentation, apparatus 1. As illustrated by FIG. 2A, a display area Sb of the projection device 10 can be increased by using the reflector plate 15 and placing the screen 22 to curve in the depth direction seen from a user U reading a book 40 (or to curve outward with respect to the user U). This in turn makes it possible to increase the amount of content information that can be displayed in the display area Sb, and to give more special effects to the book 40. Still, however, the screen 22 may be omitted, and the projection device 10 may be configured to display content information on, for example, a surrounding wall.

The projecting part 11 includes a processor 16. The processor 16 sends and receives information such as content information to and from the information processing apparatus 20 connected to the projection device 10 via a USB port. A capturing camera 17, a position detection camera 18, and a line-of-sight sensor 19 are provided on the front side of the projecting part 11.

The capturing camera 17 is disposed next to the position detection camera 18, and captures images of, for example, the front cover and pages of the book 40 placed in a sensing area Sa in front of the user U. The position detection camera 18 is an example of a distance sensor that measures distances of objects around the user U. In place of the position detection camera 18, a Kinect sensor or an infrared sensor may be used as the distance sensor. The position detection camera 18 is used, for example, to detect the shapes of objects around the user U and gestures of the user U. With the position detection camera 18, it is possible, for example, to provide projection mapping corresponding to the shapes of surrounding objects, and to output content information corresponding to a gesture performed by the user U. Still, however, the position detection camera 18 may be omitted.

Figure 2B:
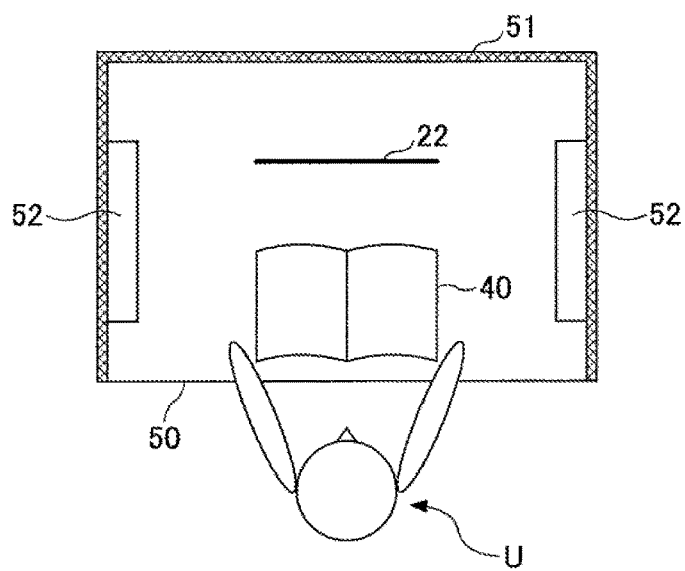

FIG. 2B is a plan view of an area around the desk 50. As illustrated by FIG. 2B, a wall 51 may be provided to surround the desk 50, and the screen 22 may be placed between a portion of the wall 51 in front of the user U and the book 40. Also, light-emitting diode (LED) illuminators 52 may be provided to the right and left of the user U. The screen 22 and the LED illuminators 52 can enhance special effects provided by content information output from the projection device 10.

The line-of-sight sensor 19 detects the line of sight of the user U. For example, the line-of-sight sensor 19 may be implemented by a low-resolution camera and a near-infrared LED and configured to detect a pupil of the user U.

With the above configuration, while the user U is reading the book 40, the projection device 10 can, for example, display content information regarding characters in the book 40 or output an audio message about a zoo based on environmental control information corresponding to captured images of opened pages 41 and 42 of the book 40 or tag information 43, 44 on the pages 41 and 42. Thus, the projection device 10 can give special effects to the book 40 in a real space.

The information processing apparatus 20 may be implemented by any type of electronic apparatus such as a personal computer (PC) or a tablet computer capable of information processing. The information processing apparatus 20 obtains an image captured by the capturing camera 17, performs image processing on the obtained image, identifies environmental control information corresponding to the obtained image, and controls the projection device 10 based on the identified environmental control information.

For example, assuming that the LED illuminators 52 and the projector 12 are installed in a reading booth, the information processing apparatus 20 performs image recognition on a page of the book 40 to identify the content of the page, causes the projector 12 to project an image corresponding to the identified content, and causes the LED illuminators 52 to emit light according to the identified content. When the user U turns pages of the book 40, touches an item on a page of the book 40, or touches an item in an image projected by the projector 12, the information processing apparatus 20 causes a relevant device to output the corresponding content information. For example, when the user U performs a gesture to touch a giraffe in a projected image in FIG. 1, the information processing apparatus 20 causes an audio device to output an audio message "You can meet me at XXX zoo!".

In the present embodiment, the book 40 is used as an example of a recording medium placed in the sensing area Sa. However, the recording medium placed in the sensing area Sa is not limited to the book 40, and may be, for example, a compact disk (CD) or a digital versatile disk (DVD). When the recording medium is a CD or a DVD, for example, the capturing camera 17 of the projection device 10 captures an image of the jacket of the CD or DVD, and the information processing apparatus 20 identifies environmental control information based on the captured image and causes the projection device 10 to output content information on or around the CD or DVD based on the identified environmental control information.

In the present embodiment, the projection device 10 is mainly used as an example of a display device to be controlled based on environmental control information. However, any other device such as a monitor may also be used as the display device. As illustrated in FIG. 3, devices (hereinafter referred to as "control target devices") to be controlled based on environmental control information may include, in addition to the projection device 10, a light-emitting device 71 (e.g., the LED illuminators 52), an audio device 72 (e.g., a speaker), a temperature control device 71 (e.g., an air conditioner or a heater), an air-flow control device 74 (e.g., an air conditioner or an electric fan), a vibration device 75 (e.g., a device for vibrating a chair), and an aroma emitting device 76 (e.g., an aroma sprayer). The control target devices may be disposed around the sensing area Sa.

<Functional Configuration of Information Presentation Apparatus>

Next, an exemplary functional configuration of the projection device 10 and the information processing apparatus 20 is described with reference to FIG. 3.

[Projection Device]

The projection device 10 may include an input-output interface (I/F) 2 in addition to the projector 12, the capturing camera 17, the position detection camera 18, and the line-of-sight sensor 19 described above. The input-output interface 2 receives an image captured by the capturing camera 17, and transfers the image to the information processing apparatus 20. The input-output interface 2 also receives information on protrusions and recesses of the wall 51 detected by the position detection camera 18, and transfers the information to the information processing apparatus 20. Also, the input-output interface 2 receives, for example, content information from the information processing apparatus 20, and outputs the content information to the projector 12. In response, the projector 11 projects the content information. Further, the input-output interface 2 receives line-of-sight information detected by the line-of-sight sensor 19, and sends the line-of-sight information to the information processing apparatus 20.

[Information Processing Apparatus]

The information processing apparatus 20 may include a storage 31, an acquirer 37, an image processor 38, and a controller 39. The controller 39 may include an aroma controller 21, a display controller 24, a light controller 25, an audio controller 26, a temperature controller 27, an air-flow controller 28, and a vibration controller 29.

The display controller 24 controls a display device such as the projection device 10 or a monitor. The light controller 25 controls light output from the light-emitting device 71. The audio controller 26 controls audio output from the audio device 72. The temperature controller 27 controls the temperature of the temperature control device 73. The air-flow controller 28 controls the air flow of the air-flow control device 74. The vibration controller 29 controls the vibration of the vibration device 75 provided on, for example, a chair. The aroma controller 21 controls the amount of fragrance evaporated from the aroma emitting device 76.

The acquirer 37 obtains an image captured by the capturing camera 17. The image processor 38 performs image processing on the obtained image. For example, the image processor 38 processes an image of facing pages of the book 40. The image processor 38 may obtain tag information or an augmented reality (AR) marker from the captured image.

The image processor 38 may also identify shapes of objects (e.g., shapes of corners 45 and 46 of the book 40 in FIG. 1) in a processed image. Further, the image processor 38 may extract environmental control information associated with an image based on, for example, a bar code or a quick response (QR) code in the image.

The storage 31 stores an environmental control information table 32, a book ID table 33, an external information table 35, and a related information table 36. The environmental control information table 32 and the book ID table 33 are described below with reference to FIGS. 4 through 8. The external information table 35 and the related information table 36 are described later in association with a variation of the present embodiment.

[Environmental Control Information Table]

FIG. 4 is a drawing illustrating an example of the environmental control information table 32. The environmental control information table 32 stores book identification information 321, image information 322, and control information 323. The book identification information 321 is an identifier (ID) for identifying each book in, for example, a library. The environmental control information table 32 of FIG. 4 stores the image information 322 and the control information 323 (which may be collectively referred to as "environmental control information") in association with each other for each book identified by the book identification information 321. The image information 322 indicates images of respective pages of the book 40. The control information 323 includes information for identifying content information, a control target device used to output the content information, and a position and timing at which the content information is to be output. In the example of FIG. 4, "page 1 image" in the image information 322 is associated with "page 1 control information" in the control information 323. Thus, the environmental control information table 32 stores control information for each of first through last pages of a book. For example, the environmental control information table 32 stores control information, for each of pages 41 and 42 of the book 40 in FIG. 1 so that different contents are output for pages 41 and 42 based on the control information.

Figure 5:
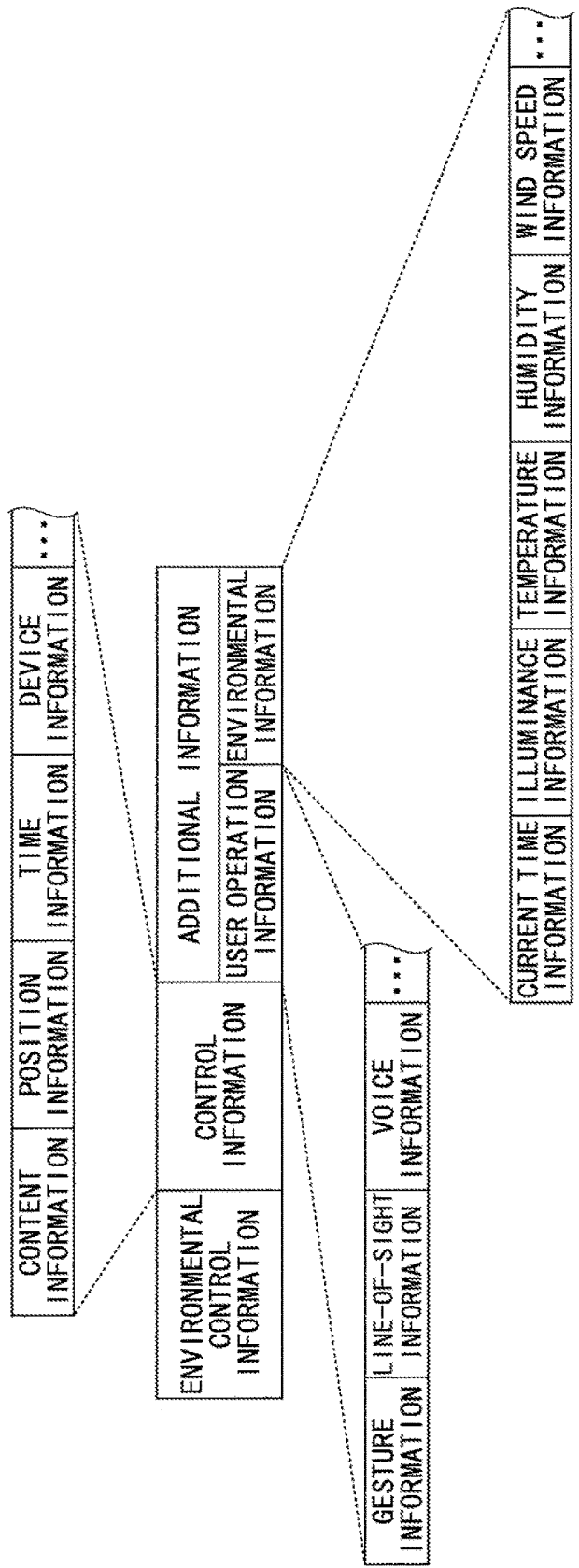
FIG. 5 is a drawing illustrating an exemplary data structure of environmental control information.

FIG. 5 is a drawing illustrating an exemplary data structure of environmental control information. The environmental control information may include control information. The control information may include content information, position information, time information, and device information. With the environmental control information, the information presentation apparatus 1 can determine content information to be output, a control target device used to output the content information, and a position in the display area Sb and timing at which the content information is to be output.

The environmental control information may also include additional information. The additional information may include user operation information and environmental information. The user operation information may include gesture information that varies according to user operations, line-of-sight information of the user, and voice information of the user. The environmental information may include current time information, illuminance (lux) information, temperature information, humidity information, and wind speed information. The environmental information may also include information that varies according to the environment surrounding the sensing area Sa. Further, the environmental information may include seasonal information. Including the seasonal information makes it possible to output contents suitable for each season. The environmental information may be either predetermined or may be dynamically changed according to changes in the surrounding environment detected based on, for example, measurements of a temperature sensor and a humidity sensor.

FIG. 6 is a drawing illustrating another example of the environmental control information table 32. The environmental control information table 32 of FIG. 6 is different from the environmental control information table 32 of FIG. 4 in that the image information 322 is replaced with tag information 422. That is, the environmental control information table 32 of FIG. 6 stores the tag information 422 and the control information 323 (which may be collectively referred to as "environmental control information") in association with each other for each book identified by the book identification information 321. For example, the environmental control information table 32 stores tag information 43, 44 embedded in pages 41 and 42 of the book 40 in FIG. 1 so that different contents are output for pages 41 and 42 based on the control information 323 corresponding to the tag information 43, 44.

Figure 7:
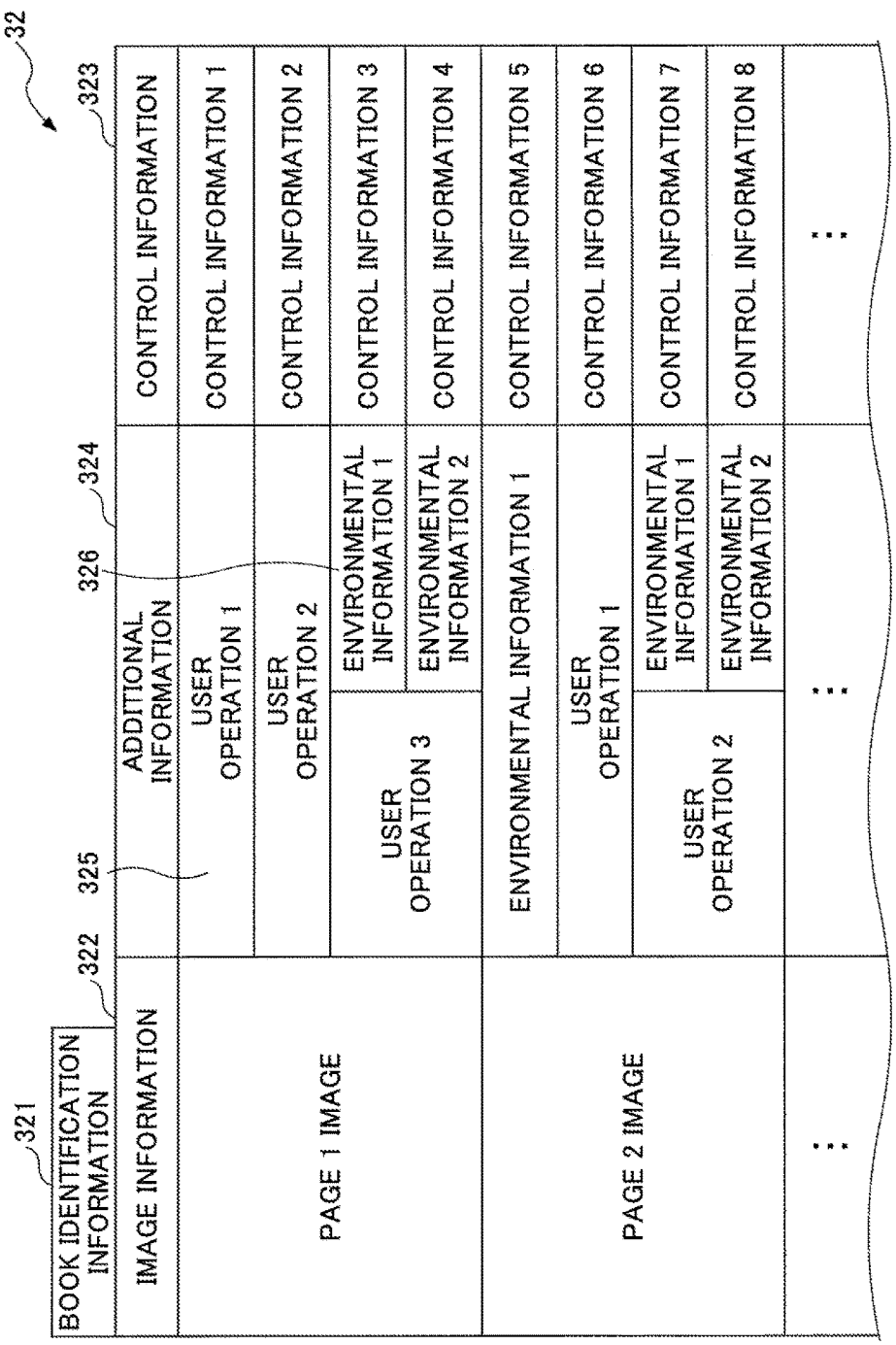
FIG. 7 is a drawing illustrating another exemplary environmental control information table.

FIG. 7 is a drawing illustrating another example of the environmental control information table 32. The environmental control information table 32 of FIG. 7 is different from the environmental control information table 32 of FIG. 4 in that additional information 324 is added. The additional information 324 may include at least one of user operation information 325 and environmental information 326. In the environmental control information table 32 of FIG. 7, four sets of control information 1 through 4 are stored as the control information 323 in association with information items in the additional information 324 corresponding to "page 1 image" in the image information 322. With the environmental control information table 32 of FIG. 7, even when the same user operation is performed, it is possible to give different special effects based on different types of control information according to differences in environmental information.

For example, the projection device 10 detects a gesture performed, by the user U by using the capturing camera 17 or the position detection camera 18, and the information processing apparatus 20 obtains gesture information corresponding to the detected gesture. The display controller 14 obtains the control information 323 corresponding to the gesture information (user operation in the additional information 324), and controls the output of content information based on the obtained control information 323.

Also, the projection device 10 detects the position of the book 40 and the shape of the surrounding wall 51 by using the position detection camera 18, and the information processing apparatus 20 obtains the position of the book 40 and the shape of the surrounding wall 51 as environmental information. With such environmental information, for example, the display controller 24 can output an image taking into account the shape of a three-dimensional object (e.g., protrusions and recesses of the wall 51). Thus, projection mapping can be performed, for example, by projecting content information on an image in the book 40 or on the wall 51 based on environmental information in addition to the image information 322. That is, the information presentation apparatus 1 can detect the environment of a reading space, and change the way in which contents are output based on the detected environment.

[Book ID Table]

FIG. 8 is a drawing illustrating an example of the book ID table 33. The book ID table 33 stores tag information 331 and book identification information 332. Examples of the tag information 331 include image information of the front cover of a book, an AR marker attached to a book, and a chip (RF tag) embedded in a book. The book ID table 33 of FIG. 8 stores AR markers as the tag information 331 and book IDs as the book identification information 332 in association with each other.

<Information Presentation Process>

Next, an exemplary information presentation process is described with reference to FIG. 9. The information presentation process is performed mainly by the information processing apparatus 20. When the information presentation process is started, the acquirer 37 obtains a captured image of, for example, a front cover of a book from the projection device 10, and the image processor 38 identifies tag information of the book in the captured image. The controller 39 identifies a book ID associated with the tag information by referring to the book ID table 33 (step S10). Next, the controller 39 obtains sets of environmental control information corresponding to the identified book ID from the environmental control information table 32 (step S12).

Next, the acquirer 37 obtains image information or tag information of an opened page of the book (step S14). Next, the controller 39 determines whether the obtained image information or tag information exists in the obtained sets of environmental control information (step S16). When it is determined at step S16 that the obtained image information or tag information does not exist in the obtained sets of environmental control information, the controller 39 ends the process.

On the other hand, when it is determined at step S16 that the obtained image information or tag information exists in the obtained sets of environmental control information, the controller 39 performs an environmental control process corresponding to the obtained image information or tag information (step S18). After the environmental control process is performed, the information presentation process returns to step S14 and steps S14 through S18 are repeated.

<Environmental Control Process>

Figure 9:
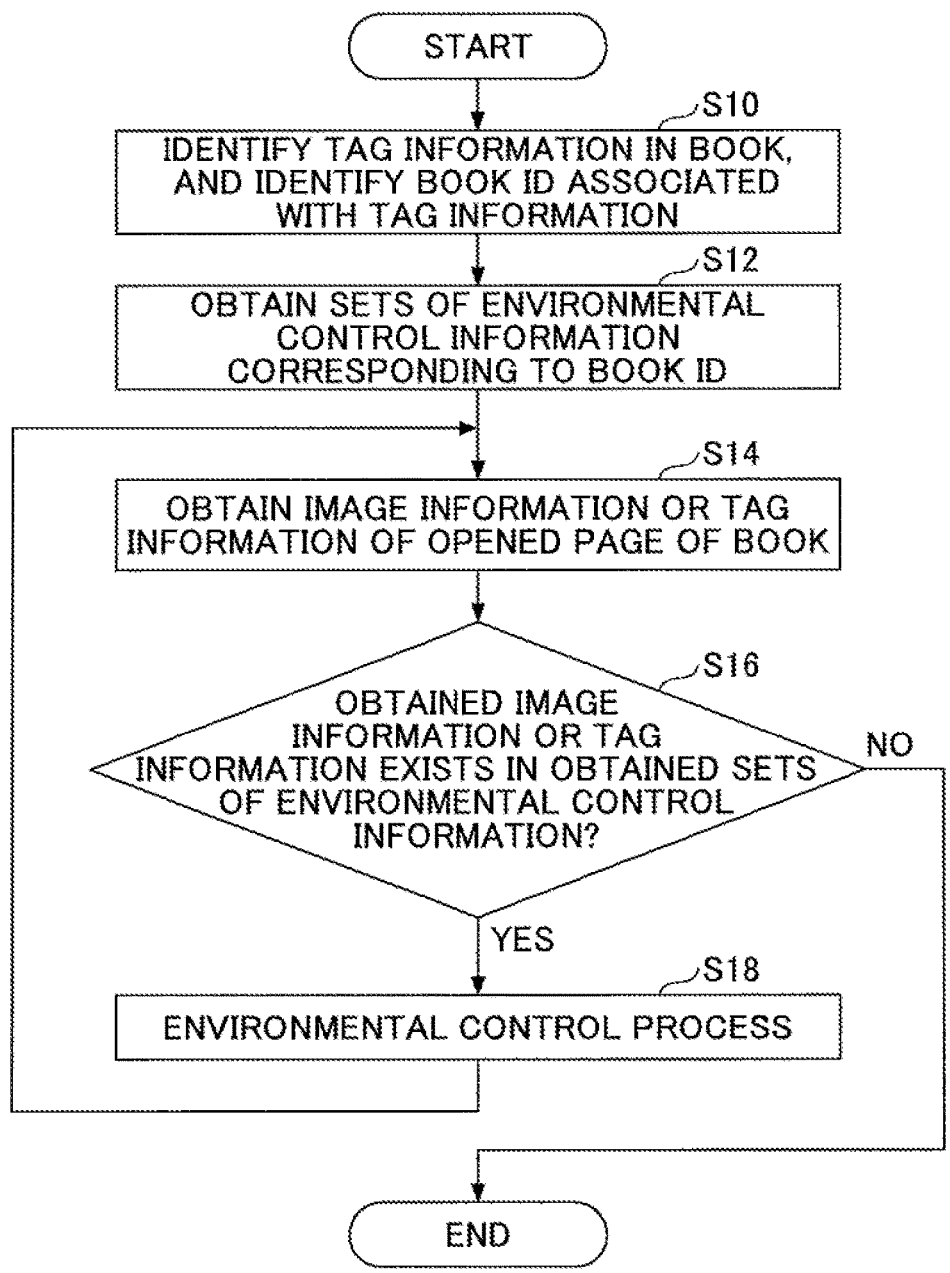
FIG. 9 is a flowchart illustrating an exemplary information presentation process.

The environmental control process performed at step S18 of FIG. 9 is described with reference to FIG. 10. The environmental control process is performed mainly by components of the controller 39. The display controller 24 determines whether to control a display device (in the present embodiment, the projection device 10) based on device information in control information in the environmental control information corresponding to the obtained image information or tag information (step S100). When it is determined at step S100 to not control the display device, the process proceeds to step S104. When it is determined at step S100 to control the display device, the display controller 24 causes the display device to display a specified content at a specified position and time based on content information, position information, and time information in the control information (step S102).

Next, the audio controller 26 determines whether to control the audio device 72 based on the device information in the control information (step S104). When it is determined at step S104 to not control the audio device 72, the process proceeds to step S108. When it is determined at step S104 to control the audio device 72, the audio controller 26 causes the audio device 72 to output a specified audio content at a specified time based on the content information and the time information in the control information (step S106).

Next, the light controller 25 determines whether to control the light-emitting device 71 based on the device information in the control information (step S108). When it is determined at step S108 to not control the light-emit tines device 71, the process proceeds to step S112. When it is determined at step S108 to control the light-emitting device 71, the light controller 25 causes the light-emitting device 71 to output a specified light content with specified brightness and colors at a specified position and time based on the content information, the position information, and the time information in the control information (step S110).

Next, the controller 39 determines whether to control another control target device based on the device information in the control information (step S12). When it is determined at step S112 to not control another control target device, the controller 39 ends the process. When it is determined at step S112 to control another control target device, the controller 39 controls the control target device to output a specified content based on the control information (step S114), and ends the process.

In step S114, when the control target device is the temperature control device 73, the temperature controller 27 controls the temperature of the temperature control device 73. When the control target device is the air-flow control device 74, the air-flow controller 28 controls the air flow of the air-flow control device 74. When the control target device is the vibration device 75, the vibration controller 29 controls the vibration of the vibration device 75 provided on, for example, a chair. When the control target device is the aroma emitting device 76, the aroma controller 21 controls the amount of fragrance evaporated from the aroma emitting device 76.

As described above, the information presentation apparatus 1 and the information presentation method of the present embodiment make it possible to give special effects to a book in a real space by combining the real space with a virtual space.

With the related-art technologies, it is difficult to give special effects to a paper book being read by a user in a real space as in a case where a user reads an electronic book in a virtual space. Also, the amount of information that can be presented around a paper book, in a real space is less than the amount of information that can be presented around an electronic book. For example, an electronic book can provide detailed information on a topic to the user.

Here, because an electric book is displayed on a relatively-small screen of a device such as a tablet computer, the amount of information of an electronic book displayable at a time on the screen is limited. On the other hand, with a paper book, the user can view facing pages at once, and can easily find information by turning pages.

As an example, when an image of the lion is included in a book being read by a user in a real space, the information presentation apparatus 1 of the present embodiment can display, on the screen 22, a video of the lion, an explanation of the lion not included in the book, and any other information related to the lion, and also output a cry of the lion. Thus, the present embodiment makes it possible to give special effects to a book being read by a user by combining a real space with a virtual space, and to provide an added-value service to the user.

Although there exists a book that comes with a DVD, contents of such a DVD do not give special effects to the book being read in a real space. On the other hand, the information presentation apparatus 1 of the present embodiment can give special effects to a book being read in a real space by using images, light, and sounds according to the surrounding environment. Thus, the present embodiment can provide added-value user experience by combining a real space and a virtual space.

<Variations>

Next, variations of the above embodiment are described.

[Environmental Control Information Table]

Figure 11:
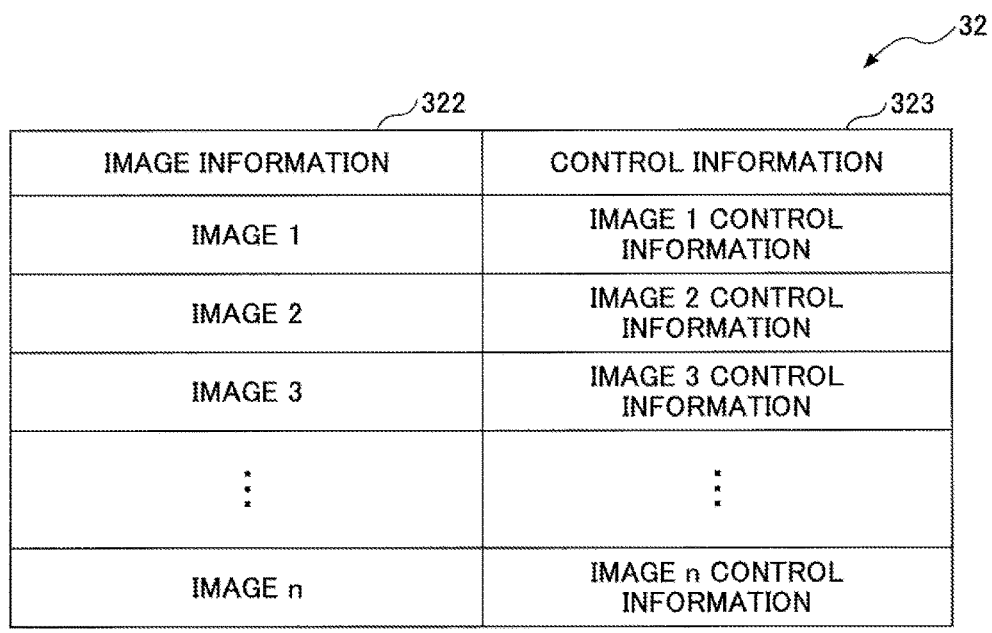
FIG. 11 is a drawing illustrating another exemplary environmental control information table.

FIG. 11 is a drawing illustrating a variation of the environmental control information table 32. The environmental control information table 32 of FIG. 11 is different from the environmental control information table 32 of FIG. 4 in that the book identification information 321 is omitted, and the image information 322 and the control information 323 are associated with each other.

FIG. 12 is a drawing illustrating still another example of the environmental control information table 32. The environmental control information table 32 of FIG. 12 is different from the environmental control information table 32 of FIG. 11 in that the additional information 324 is added. The additional information 324 may include at least one of the user operation information 325 and the environmental information 326.

[Information Presentation Process]

Next, a variation of the information presentation process is described with reference to FIG. 13. The information presentation process of this variation is performed mainly by the information processing apparatus 20. When the information presentation process is started, the acquirer 37 obtains captured image information of the book 40 or obtains tag information based on a radio signal sent from a chip (RF tag) embedded in the book 40 (step S22). Next, the controller 39 searches the environmental control information table 32 to find environmental control information corresponding to the image information or the tag information (step S24).

Next, the controller 39 determines whether environmental control information corresponding to the image information or the tag information has been obtained from the environmental control information table 32 (step S26). When it is determined at step S26 that environmental control information corresponding to the image information or the tag information has not been obtained, the controller 39 ends the process.

On the other hand, when it is determined at step S26 that environmental control information corresponding to the image information or the tag information has been obtained, the controller 39 performs an environmental control process based on the obtained environmental control information (step S28). After the environmental control process is performed, the information presentation process returns to step S22 and steps S22 through S28 are repeated.

[Environmental Control Process]

Figure 13:
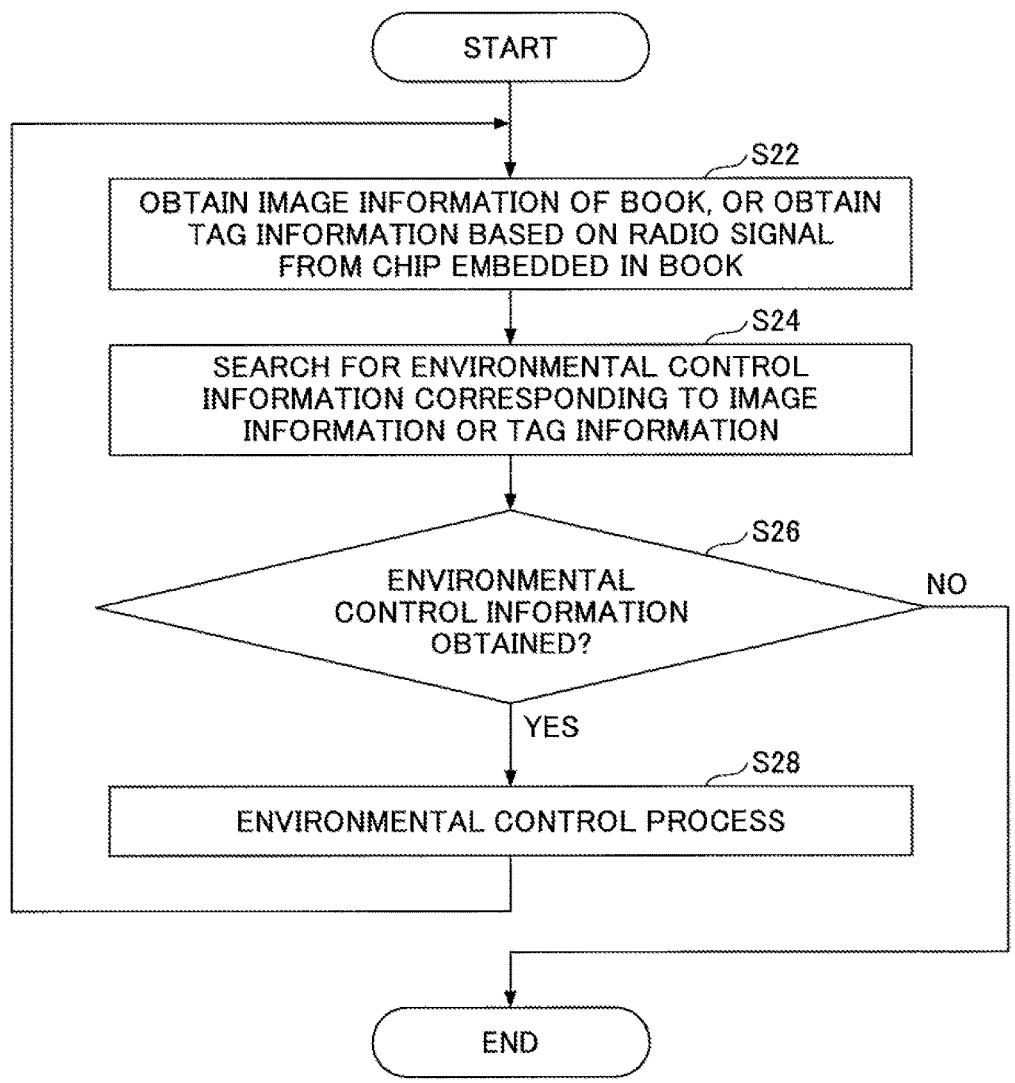
FIG. 13 is a flowchart illustrating another exemplary information presentation process.

The environmental control process performed at step S28 of FIG. 13 is substantially the same as the environmental control process described with reference to FIG. 10, and its description is omitted here.

The information presentation method of this variation also makes it possible to give special effects to a book in a real space by combining the real space with a virtual space. This in turn enables a user reading a book to get better understanding of the book through experiential learning.

[Method of Obtaining Book Identification Information]

The acquirer 37 may obtain book identification information based on line-of-sight information of the user U detected by the line-of-sight sensor 19 and image information of a book being read by the user U. FIG. 14 is a drawing illustrating an example of the book ID table 33 used in this case. In the book ID table 33 of FIG. 14, different book IDs (book identification, information 332) are associated with directions A, B, C, and D (line-of-sight information 333) that are associated with the same image 1 (image information 331). With the book ID table 33 of FIG. 14, the acquirer 37 can identify book identification information of an appropriate book based on the direction the user U is facing.

[Method of Determining Orientation of Content]

The acquirer 37 can obtain the arrangement of tag information (or tags) on opened pages of the book 40, the arrangement of image information (or images) of opened pages of the book 40, and the shapes of opened pages of the book 40. The display controller 24 may be configured to determine the orientation in which a content (content information) is displayed based on one or more of the arrangement of tag information, the arrangement of image information, and the shapes of pages obtained by the acquirer 37. This in turn makes it possible to display a content in an orientation suitable for the user U reading the book 40.

For example, based on the arrangement of the tag information 43 and the tag information 44 (e.g., the directions of the arrows or the positional relationship between the tag information 43 and the tag information 44) in FIG. 1, the display controller 24 determines whether the user U is reading the book 40 in a direction from page 41 to page 42 or a direction from page 42 to page 41, and thereby determines the direction the user U is facing. Accordingly, the display controller 24 can display a content in an orientation suitable for the direction the user U is facing.

As another example, the display controller 24 may determine the direction the user U is facing based on the arrangement of images (e.g., the orientation of the lion or the arrangement of lions) on page 41 of the book 40 in FIG. 1, or based on the arrangement of images (e.g., the orientation or arrangement of characters) on page 42 of the book 40 in FIG. 1. Further, the display controller 24 may determine the direction the user U is facing based on the shapes of corners 45 and 46 of the book 40 being read by the user U.

[Guidance by Content Information]

The information presentation apparatus 1 can output content information that serves as guidance for the user to find desired information in a book and thereby improve user convenience. This is described with reference to FIGS. 15 through 17.

Figure 17:
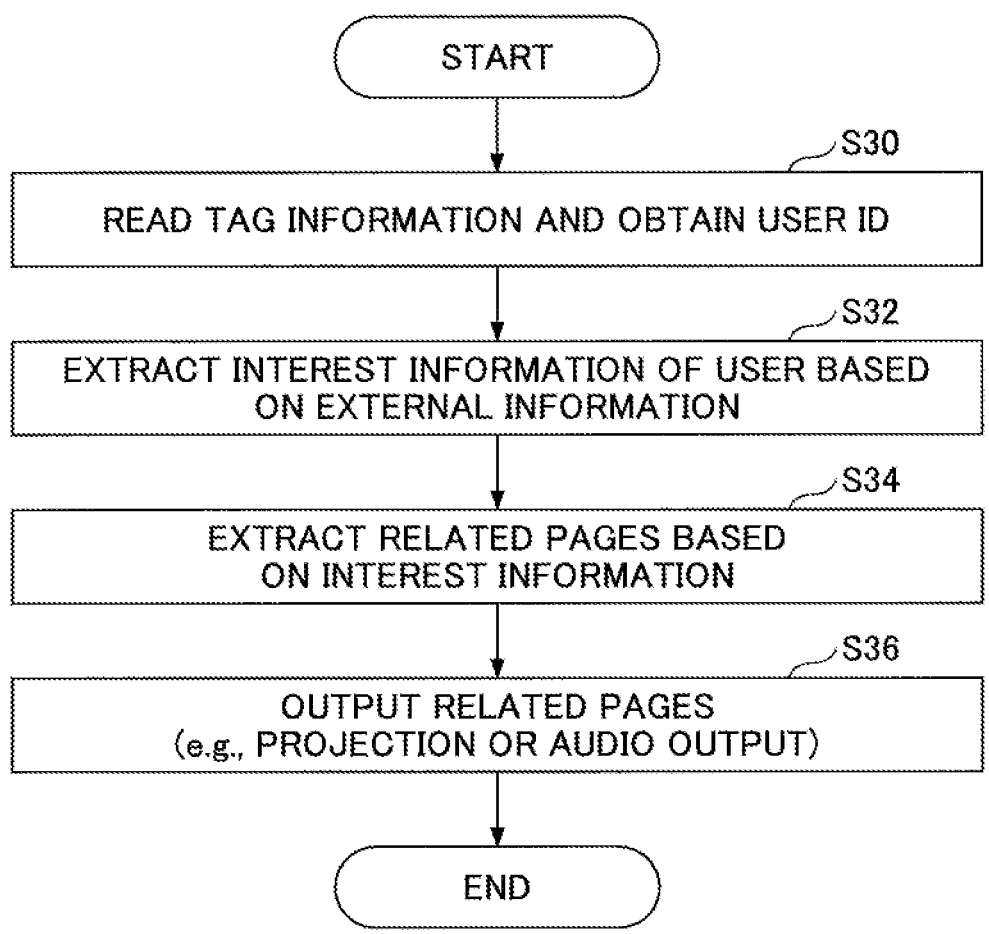
FIG. 17 is a flowchart illustrating another exemplary environmental control process.

FIG. 15 is a drawing illustrating an example of an external information table 35. FIG. 16 is a drawing illustrating an example of a related information table 36. FIG. 17 is a flowchart illustrating another exemplary environmental control process.

The external information table 35 of FIG. 15 stores borrowing history information for each user ID 351 assigned to, for example, a library card. The borrowing history information includes date information 352, borrowed-book information 353, and classification information 354 that are associated with each other. Based on the borrowing history information indicating books borrowed by a user, the controller 39 can obtain interest information indicating preference and interest of the user. The borrowed-book information 353 and the classification information are examples of external information for the user. Examples of external information may also include a shopping history and a dining-out history.

The related information table 36 of FIG. 16 stores interest information 351 and related-page information 362 that are associated with each other. In this example, the related information table 36 is associated with a book ID of the book 40, and the related-page information 362 includes related pages of the book 40.

The book 40 is an animal encyclopedia. In the example of FIG. 16, when the interest information 361 is "animal", all pages of the book 40 are related pages. When the interest information 361 is "animal+rabbit", pages 5-10 of the book 40 are related pages.

[Environmental Control Process]

In FIG. 17, when the environmental control process is started, the acquirer 37 reads tag information and obtains a user ID (step S30). For example, the acquirer 37 may obtain a user ID based on an RF tag 47 attached to the book 40 in FIG. 1.

Next, the controller 39 extracts interest information of a user based on external information (e.g., the classification information 354 stored in the external information table 35) corresponding to the obtained user ID (step S32). For example, the controller 39 extracts interest information "animal+rabbit+disease+food" from the classification information 354 of the external information table 35 of FIG. 15.

Next, the controller 39 refers to the related information table 36, and extracts related pages of the book 40 from the related page information 362 associated with the interest information 361 corresponding to the extracted interest information (step S34). Next, the audio controller 26 outputs an audio message indicating the extracted related pages (step S36), and the process ends. In the example of FIG. 16, an audio message "page 8" is output. As described above, the information presentation apparatus 1 can output content information that serves as guidance for the user to find desired information in a book, and thereby improve user convenience.

At step S36 FIG. 17, light may be output instead of or together with the audio message to report the related page to the user. In this case, the light-emitting device 71 may output light (light beam) pointing to the related page or output a light message representing a numeral indicating the related page.

[Another Example of Guidance by Content Information]

Figure 10:
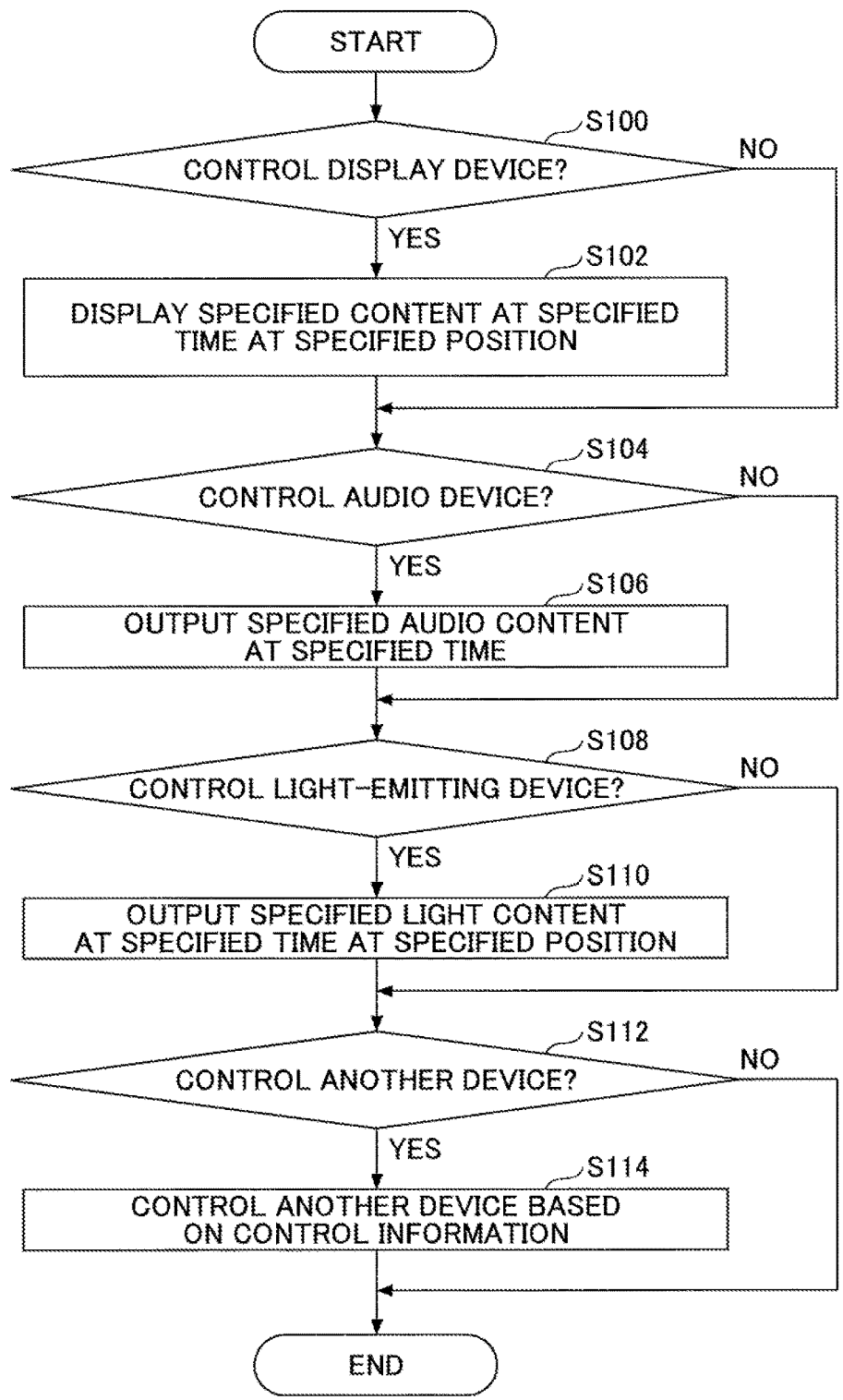
FIG. 10 is a flowchart illustrating an exemplary environmental control process.

As another example of guidance by content information, at step S106 of FIG. 10, the audio controller 26 causes the audio device 72 to output an audio message narrating a content written in the book 40 (i.e., to "read out" the content of the book 40). While the audio message is being output, the light controller 25 at step S110 causes the light-emitting device 71 to output light (light beam) pointing to or surrounding a portion of the book 40 which is currently being "read out" by the audio message.

[Variations of Information Presentation Apparatus]

Next, variations of the information presentation apparatus 1 are described with reference to FIGS. 18A through 20B. In the embodiment of FIG. 2A, the screen 22 is leaned against the projection device 10 such that the screen 22 curves in the depth direction as seen from the user U (or curves outward with respect to the user U).

Figure 18A:
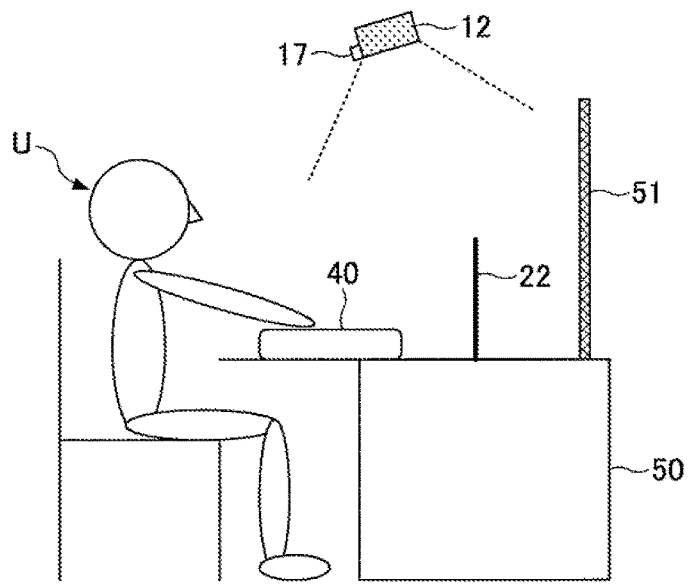
FIG. 18A is a side view and FIG. 18B is a plan view of a variation of an information presentation apparatus.
Figure 18B:
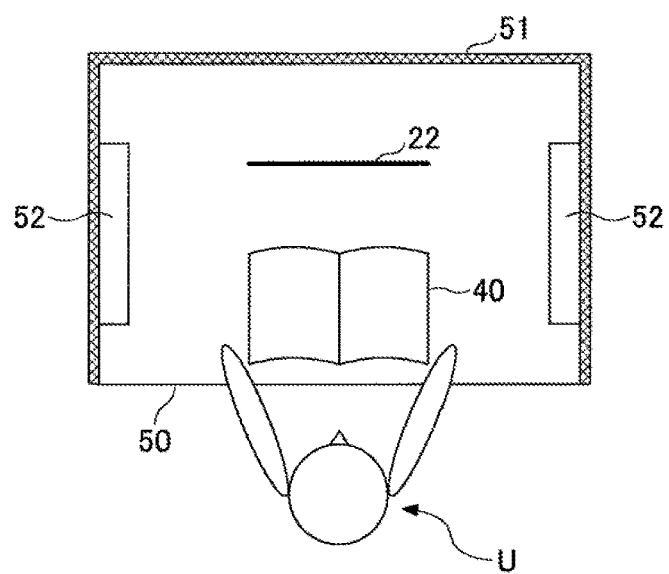

On the other hand, in the information presentation apparatus 1 of FIGS. 18A and 18B, the screen 22 is placed in an upright position in front of the wall 51 facing the user U (or located in the depth direction as seen from the user U) such that the screen 22 becomes parallel to the wall 51. With this configuration, the display controller 24 can display content information in a display area formed by the screen 22 disposed in front of the book 40 and the wall 51 disposed behind the screen 22. This configuration makes it possible to give depth and reality to displayed contents.

In this case, a translucent screen may be used as the screen 22. For example, the display controller 24 may be configured to dynamically display a background image on the wall 51 by projection mapping, and to dynamically display characters in the book 40 on the screen 22 to provide better special effects.

Figure 19A:
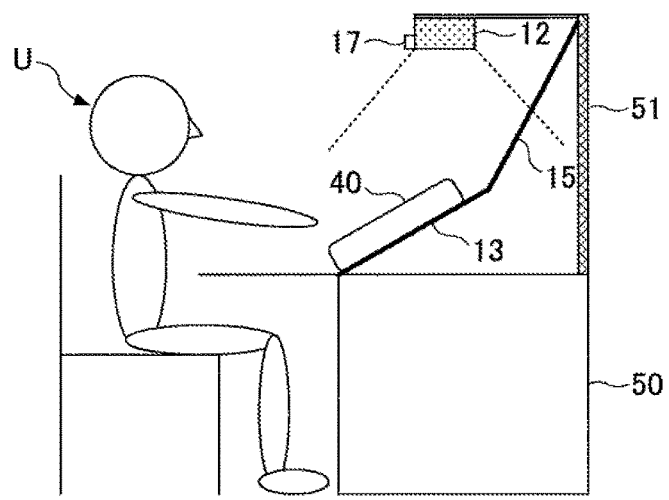
FIG. 19A is a side view and FIG. 19B is a plan view of a variation of an information presentation apparatus.
Figure 19B:
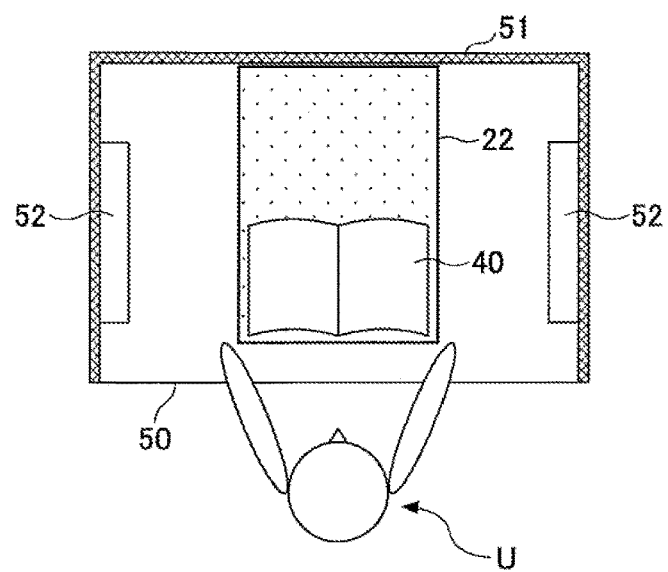

In the information presentation apparatus 1 of FIGS. 19A and 19B, the mount 13 is inclined so that it is easier for the user U to read the book 40 placed on the mount 13. Also, one end of the reflector plate 15 is connected at an angle to the mount 13, and another end of the reflector plate 15 is fixed to the wall 51 facing the user U (or located in the depth direction seen from the user U) such that the structure formed by the mount 13 and the reflector plate 15 is leaned against the wall 51. With this configuration, it is possible to reflect and display information projected downward from the projector 12 with the reflector plate 15.

Figure 20A:
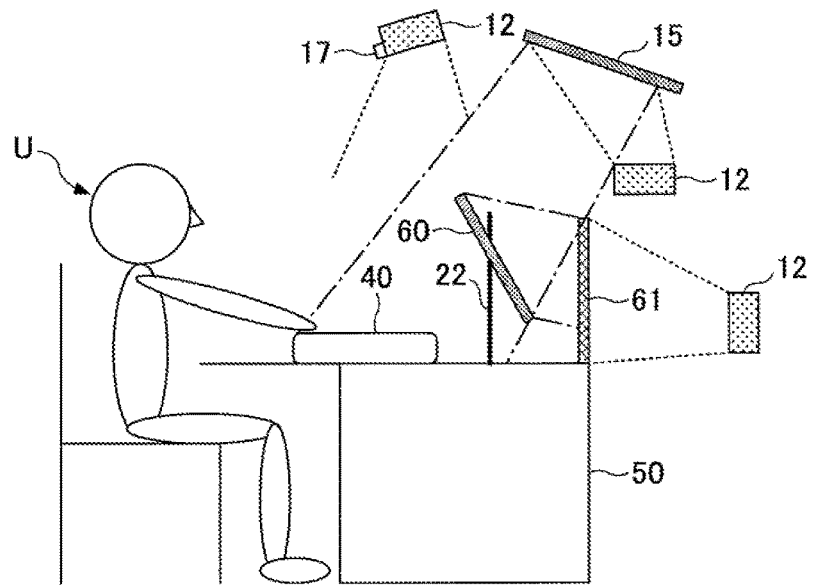
FIG. 20A is a side view and FIG. 20B is a plan view of a variation of an information presentation apparatus.
Figure 20B:
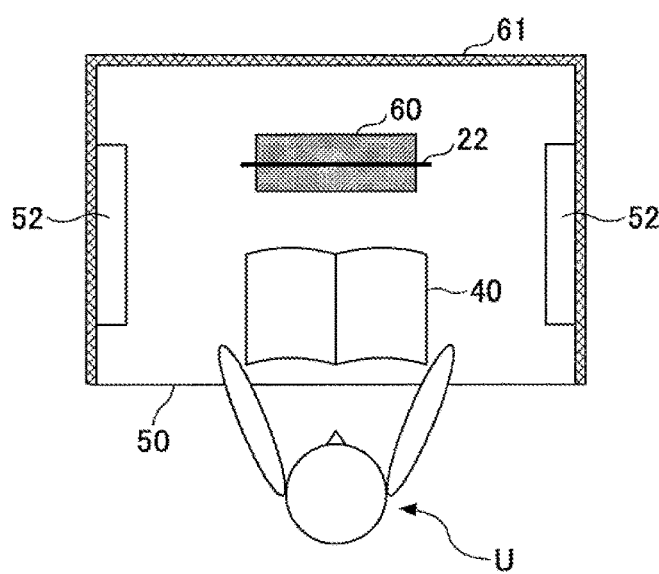

The information presentation apparatus 1 of FIGS. 20A and 20B includes two screens 22 and 61, two reflector plates 15 and 60, and first and second projectors 12. The screens 22 and 61 are arranged in the depth direction seen from the user U (or in a direction the user U is facing). The screens 22 and 61 are in upright positions, and the screen 61 is disposed behind the screen 22. The reflector plate 60 is supported by the screen 22, and is inclined with respect to the screen 22. The screens 22 and 61 are implemented by translucent screens. With this configuration, it is possible to reflect information projected upward from the first projector 12 with the reflector plate 15, and display the projected information on or around the book 40 in front of the user U. Also with this configuration, it is possible to reflect information projected laterally from the second projector 12 with the reflector plate 60, and display the projected information on the screen 61 behind the screen 22. For example, the configuration of FIGS. 20A and 20B makes it possible to display a stereoscopic image of a character.

<Hardware Configuration>

Figure 21:
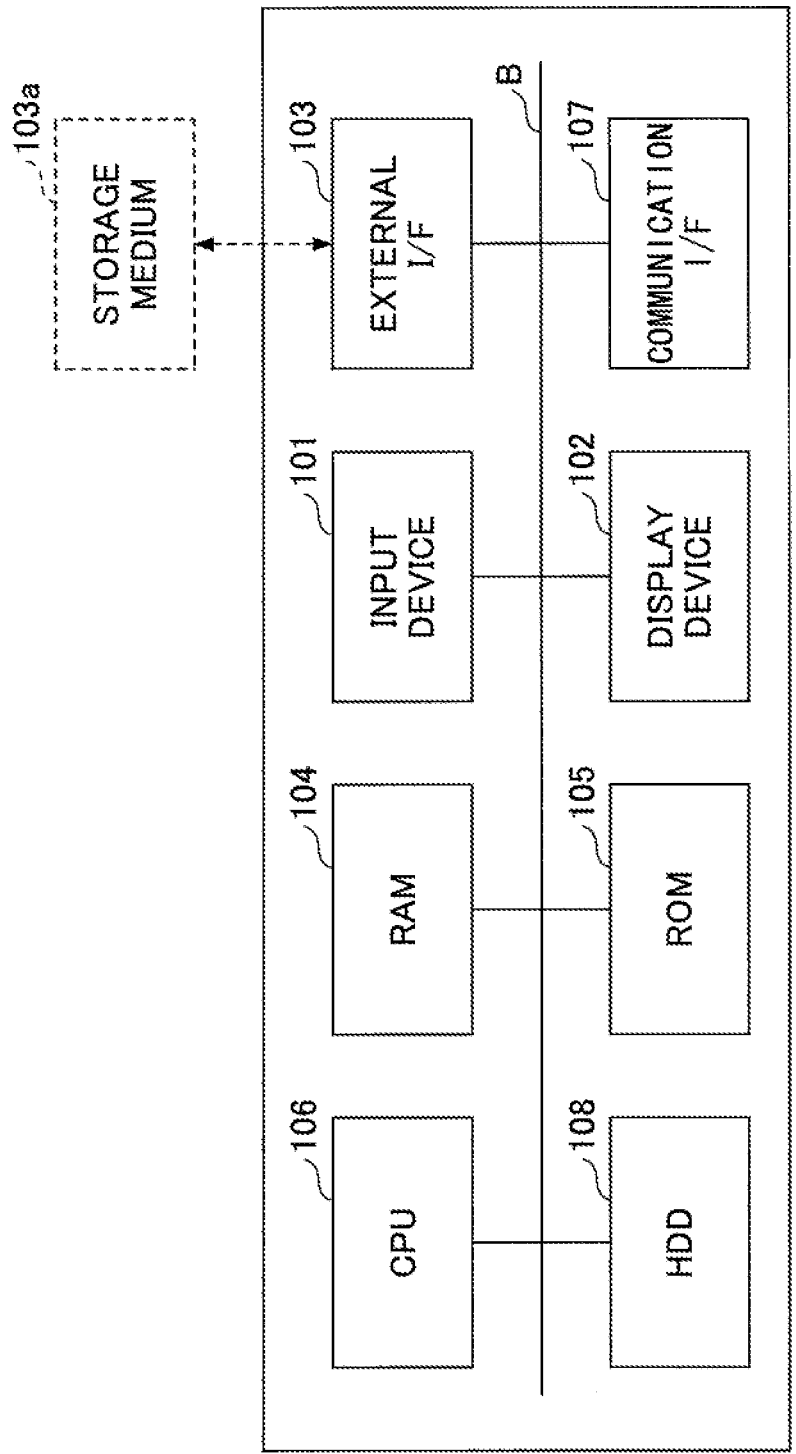
FIG. 21 is a block diagram illustrating an exemplary hardware configuration of an information processing apparatus.

An exemplary hardware configuration of the information processing apparatus 20 is described with reference to FIG. 21. FIG. 21 is a block diagram illustrating an exemplary hardware configuration of the information processing apparatus 20. The information processing apparatus 20 may include an input device 101, a display device 102, an external I/F 103, a random access memory (RAM) 104, a read-only memory (ROM) 105, a central processing unit (CPU) 106, a communication I/F 107, and a hard disk drive (HDD) 108 that are connected to each other via a bus B.

The input device 101 may include a keyboard and a mouse, and is used to input instructions (or operation signals) into the information processing apparatus 20. The display 102 displays various processing results. The communication I/F 107 is an interface for connecting the information processing apparatus 20 to the projection device 10. With the communication I/F 107, the information processing apparatus 20 can perform data communications with the projection device 10.

The HDD 108 is a non-volatile storage device for storing various programs and data. For example, the HDD 108 may store basic software for controlling the entire information processing apparatus 20, and programs for causing the information processing apparatus 20 to perform the information presentation process and the environmental control process.

The external I/F 103 is an interface between the information processing apparatus 20 and an external device such as a storage medium 103a. The information processing apparatus 20 can read and write data from and to the storage medium 103a via the external I/F 103. The storage medium 103a may be implemented by, for example, a compact disk (CD), a digital versatile disk (DVD), a secure digital (SD) memory card, or a universal serial bus (USB) memory.

The ROM 105 is a non-volatile storage device that can retain data even when power is turned off. The ROM 105 stores, for example, programs and data such as network settings. The RAM 104 is a volatile storage device for temporarily storing programs and data. The CPU 106 is a processor that loads programs and data from storage devices (e.g., the HDD 108 and the ROM 105) into the RAM 104, and executes the loaded programs to control the entire information processing apparatus 20 and to implement various functions of the information processing apparatus 20.

For example, the CPU 106 executes the information presentation process and the environmental control process using the programs and data stored in the ROM 105 and the HDD 108. The environmental control information table 32, the book ID table 33, the external information table 35, and the related information table 36 may be stored in the RAM 104, the HDD 108, or a server in a cloud system connected via a network to the information processing apparatus 20.

An aspect of this disclosure provides an information presentation method and an information presentation apparatus that can give special effects to a recording medium in a real space being viewed by a user.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented method, comprising:
   obtaining one of image information of a book placed in a sensing area and tag information attached to the book;
   obtaining identification information of the book based on the obtained one of the image information and the tag information;
   obtaining multiple sets of environmental control information associated with the identification information of the book from a storage, each of the multiple sets of environmental control information being associated with page image information or page tag information;
   controlling an imaging device to capture an opened page of the book to obtain page image information of the opened page;
   determining whether a set of environmental control information associated with the page image information of the opened page or page tag information of the opened page obtained from the page image information exists in the multiple sets of environmental control information;
   when the set of environmental control information associated with the page image information or the page tag information of the opened page exists in the multiple sets of environmental control information, controlling a projection device disposed in a vicinity of the sensing area to project a content corresponding to the set of environmental control information onto a real space where the book is placed; and
   detecting, with a line-of-sight sensor, a line of sight of a user viewing the book,
   wherein the identification information of the book is obtained based on the detected line of sight of the user and the image information of the book.

2. The computer-implemented method as claimed in claim 1, further comprising:
   obtaining external information from the storage based on the tag information attached to the book; and
   based on the obtained external information, controlling at least one of a light-emitting device and an audio device to output at least one of light and audio indicating a page of the book.

3. The computer-implemented method as claimed in claim 1, further comprising:
   based on the set of environmental control information, controlling an audio device to read out a content written in the opened page of the book, and controlling a light-emitting device to output light pointing to a portion of the opened page of the book being read out by the audio device.

4. The computer-implemented method as claimed in claim 1, wherein each of the multiple sets of environmental control information includes gesture information, line-of-sight information, and voice information of a user.

5. The computer-implemented method as claimed in claim 1, wherein each of the multiple sets of environmental control information includes environmental information that varies according to an environment surrounding the sensing area.

6. The computer-implemented method as claimed in claim 1, further comprising:
   controlling, in addition to the projection device, one or more of a light-emitting device, an audio device, a temperature control device, an air-flow control device, a vibration device, and an aroma emitting device that are disposed around the sensing area, based on the set of environmental control information to give special effects to the book in the real space.

7. The computer-implemented method as claimed in claim 1, further comprising:
  detecting one of an orientation of the page tag information of the opened page, an arrangement or an orientation of one or more objects included in the page image information of the opened page, and a shape of the opened page; and
  based on the detected one of the orientation of the page tag information, the arrangement or the orientation of the one or more objects included in the page image information, and the shape of the opened page, controlling an orientation of the content projected by the projection device.

8. An information presentation apparatus, comprising:
  a mount including a sensing area;
  a projection device that is disposed in a vicinity of the sensing area; and
  a processor configured to
    obtain one of image information of a book placed in the sensing area of the mount and tag information attached to the book,
    obtain identification information of the book based on the obtained one of the image information and the tag information,
    obtain multiple sets of environmental control information associated with the identification information of the book from a storage, each of the multiple sets of environmental control information being associated with page image information or page tag information,
    control an imaging device to capture an opened page of the book to obtain page image information of the opened page,
    determine whether a set of environmental control information associated with the page image information of the opened page or page tag information of the opened page obtained from the page image information exists in the multiple sets of environmental control information,
    when the set of environmental control information associated with the page image information or the page tag information of the opened page exists in the multiple sets of environmental control information, control the projection device to project a content corresponding to the set of environmental control information onto a real space where the book is placed, and
    detecting, with a line-of-sight sensor, a line of sight of a user viewing the book,
  wherein the identification information of the book is obtained based on the detected line of sight of the user and the image information of the book.

9. The information presentation apparatus as claimed in claim 8, wherein the projection device projects the content onto a first display area disposed in front of the book and onto a second display area disposed behind the first display area.

10. The information presentation apparatus as claimed in claim 8, wherein the display device projects the content onto a display area formed by a reflector plate supported by the mount, the display area being disposed in front of the book and inclined with respect to a user viewing the book.

11. The information presentation apparatus as claimed in claim 8, further comprising:
  one or more of a light-emitting device, an audio device, a temperature control device, an air-flow control device, a vibration device, and an aroma emitting device that are disposed around the sensing area and give special effects to the book in the real space based on the set of environmental control information.

12. A non-transitory computer-readable storage medium storing therein a program that causes a computer to execute a process comprising:
  obtaining one of image information of a book placed in a sensing area and tag information attached to the book;
  obtaining identification information of the book based on the obtained one of the image information and the tag information;
  obtaining multiple sets of environmental control information associated with the identification information of the book from a storage, each of the multiple sets of environmental control information being associated with page image information or page tag information;
  controlling an imaging device to capture an opened page of the book to obtain page image information of the opened page;
  determining whether a set of environmental control information associated with the page image information of the opened page or page tag information of the opened page obtained from the page image information exists in the multiple sets of environmental control information;
  when the set of environmental control information associated with the page image information or the page tag information of the opened page exists in the multiple sets of environmental control information, controlling a projection device disposed in a vicinity of the sensing area to project a content corresponding to the set of environmental control information onto a real space where the book is placed; and
  detecting, with a line-of-sight sensor, a line of sight of a user viewing the book,
  wherein the identification information of the book is obtained based on the detected line of sight of the user and the image information of the book.

13. The non-transitory computer-readable storage medium as claimed in claim 12, wherein the process further comprises:
  controlling, in addition to the projection device, one or more of a light-emitting device, an audio device, a temperature control device, an air-flow control device, a vibration device, and an aroma emitting device that are disposed around the sensing area, based on the set of environmental control information to give special effects to the book in the real space.

* * * * *